United States Patent
Zhang et al.

(10) Patent No.: US 12,526,325 B1
(45) Date of Patent: Jan. 13, 2026

(54) CENTRALIZED TECHNOLOGY ACCESS CONTROL

(71) Applicant: Morgan Stanley Services Group Inc., New York, NY (US)

(72) Inventors: Andy Zhang, Shanghai (CN); John Wu, Shanghai (CN); Nishi Kant, Bangalore (IN); John K. Jordan, Glasgow (GB)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/190,115

(22) Filed: Apr. 25, 2025

(51) Int. Cl.
*H04L 9/40* (2022.01)

(52) U.S. Cl.
CPC .......... *H04L 63/205* (2013.01); *H04L 63/108* (2013.01)

(58) Field of Classification Search
CPC ............................ H04L 63/205; H04L 63/108
See application file for complete search history.

(56) References Cited

U.S. PATENT DOCUMENTS

| | | | |
|---|---|---|---|
| 8,132,231 B2 * | 3/2012 | Amies | H04L 63/102 726/4 |
| 9,032,076 B2 | 5/2015 | Buehler et al. | |
| 9,286,595 B2 * | 3/2016 | Taneja | G06Q 10/063 |
| 9,336,633 B2 | 5/2016 | Radicella et al. | |
| 10,672,212 B2 | 6/2020 | Musabeyoglu et al. | |
| 11,240,168 B2 * | 2/2022 | Edwards | H04L 47/6215 |
| 11,620,123 B1 | 4/2023 | Sharma et al. | |
| 11,870,781 B1 | 1/2024 | Medina et al. | |
| 11,895,121 B1 * | 2/2024 | Karim | H04L 63/20 |
| 11,961,347 B2 | 4/2024 | Prostko et al. | |
| 12,218,906 B1 | 2/2025 | Zhong et al. | |
| 12,267,368 B1 | 4/2025 | Goberman et al. | |
| 2017/0096123 A1 | 4/2017 | Gennermann et al. | |
| 2020/0125468 A1 * | 4/2020 | Peddibhotla | G06F 21/604 |
| 2022/0391503 A1 * | 12/2022 | Grajek | G06F 21/606 |
| 2024/0378307 A1 * | 11/2024 | Dcosta | G06F 21/604 |
| 2025/0007883 A1 | 1/2025 | Wang et al. | |

* cited by examiner

*Primary Examiner* — Amie C. Lin
(74) *Attorney, Agent, or Firm* — K&L Gates LLP (57) ABSTRACT

Computer-implemented systems and methods monitor and control entitlements for IT assets in an enterprises system based on separation of duty conflict rules. The system may determine whether existing entitlements or a requested entitlement violates the conflict rules and perform an entitlement conflict remediation action. The entitlement conflict remediation action may include automatically revoking one or more entitlements or temporally approving one or more entitlements that violate the conflict rules.

20 Claims, 6 Drawing Sheets

CENTRALIZED TECHNOLOGY ACCESS CONTROL

BACKGROUND

Enterprise IT infrastructures consist of a vast array of interconnected assets, including databases, servers, computing devices, applications, and operating systems. These assets are typically governed by access control mechanisms that define user permissions and entitlements based on organizational policies. However, managing access across large-scale and dynamic environments presents significant challenges. Organizations often rely on directory-based access management systems, such as Lightweight Directory Access Protocol (LDAP) servers, and governance frameworks to enforce policies. Despite these measures, access control mechanisms can become complex, leading to inconsistent entitlement structures, excessive permissions, and administrative burdens. Ensuring that permissions remain aligned with security policies and operational requirements requires continuous oversight and coordination among various IT systems. These assets may be managed by a centralized administrative system the creates and controls access, permissions, and entitlements. However, excess permission level may be granted exposing the enterprises system to network and security vulnerabilities.

SUMMARY

The present invention relates to a Centralized Technology Access Control (TAC) System designed to enhance the management of user entitlements across enterprise IT infrastructures while improving security, efficiency, and governance. Traditionally, enterprise IT environments face challenges in managing access permissions, often resulting in excessive entitlements that create security vulnerabilities. This invention addresses these issues through a centralized, automated system that ensures entitlements are consistently structured, monitored, and controlled.

A key advantage of the TAC system is its automated entitlement management, which eliminates the inefficiencies of manual access control by dynamically creating, mapping, and managing entitlements across an enterprise network. Using a uniform LDAP-based naming convention, the system ensures consistency in access permissions while reducing administrative overhead. The system further enhances security through the integration of a Separation of Duty (SoD) server, which evaluates entitlements in real time, detecting and preventing conflicts that could lead to unauthorized access to critical IT assets. By automatically identifying and remediating conflicts, the system mitigates risks associated with privilege creep and unauthorized privilege escalation.

In addition to security, the invention provides adaptive and dynamic access control mechanisms that allow for temporary exceptions under predefined conditions. This flexibility ensures that critical operations, such as troubleshooting in production environments, can still be performed while maintaining strict governance through controlled expiration mechanisms. The system also integrates with an Identity Governance and Administration (IGA) system, which centralizes access lifecycle management, enforces governance policies, and enhances auditability. This integration ensures enterprises remain compliant with internal security policies and external regulatory requirements.

Technically, embodiments of the present invention can improve the functioning of entitlement systems by embedding conflict detection into the entitlement lifecycle and using machine-readable naming patterns to enforce SoD policies at scale. Unlike traditional systems that rely on manual audits or static configurations, the TAC system enables real-time policy evaluation and automated remediation, improving system responsiveness and reducing the need for human oversight. These architectural improvements result in enhanced computational efficiency, reduced policy drift, and stronger enforcement of enterprise security models.

Furthermore, the TAC system can be made to be highly scalable and interoperable, designed to support a wide range of IT assets, including databases, servers, cloud-based applications, and other enterprise systems. Its compatibility with directory services, databases, and IT management platforms allows seamless deployment across diverse IT ecosystems. By combining automated entitlement management, proactive security enforcement, and centralized governance, embodiments of this invention can provide a robust and scalable solution for enterprise access control. Unlike traditional access control systems that rely on static permissions and manual audits, this invention offers a proactive and automated approach to entitlement management. By continuously monitoring access rights, enforcing SoD policies, and integrating with governance frameworks, the system ensures not only enhanced security but also improved efficiency and compliance-making it an essential solution for modern enterprise IT environments.

The system's scalable architecture allows it to seamlessly integrate with various IT assets, including databases, servers, and cloud-based applications. This interoperability reduces integration costs, enhances efficiency across multi-platform environments, and ensures that enterprises can adopt the system without significant modifications to their existing infrastructure. Embodiments can, therefore, enhance security, reduce administrative burdens, ensure regulatory compliance, and ultimately improv the overall resilience of IT infrastructure. These and other benefits that can be realized through embodiments of the present invention will be apparent from the description that follows.

FIGURES

Various embodiments of the present invention are described herein by way of example in connection with the following figures.

DESCRIPTION

In various aspect of the present invention, a technology access control (TAC) system may be used to create, map, and manage rule-based entitlements for users, and groups of users across an enterprise network. The TAC system conveniently establishes centralized management for various entitlements in the enterprise network, that may be set and defined for user attributes, access permissions, and roles of users and groups in relation to IT assets. The TAC system may also map various groups and roles between different IT assets, establish associations between assets based on created entitlements, and store these entitlements centrally on a central server. However, due to the ease of establishing access level, permissions, and entitlements through the TAC system, it is possible that certain users, groups, or teams my inadvertently be granted excessive entitlements that exposes the enterprise network to security vulnerabilities. For example, when developers have unfettered access to production data, there is a higher risk of data being accidentally or maliciously exfiltrated through a data breach. However, there may be circumstances that arise where this type of access is temporarily required such as troubling shooting errors in production environments of IT assets. Therefore, a separation of duty (SoD) server may evaluate entitlements and conditionally grant IT asset users (e.g., developers) with access to production environments, that violates a conflict rule.

In various aspects, the SoD server may be configured to automatically create a conflict rule such as limiting developers access to production environments. A developer user may be assigned an entitlement with read-only access role for some production environments. However, developers may still require access to production environments for certain functions such as trouble shooting release version or doing a production release turnover, in opposition to a conflict rule. Therefore, implementing entitlement rules may create challenges for balancing the access control requirements, user experience, and centralized management by the TAC system. Therefore, the SoD server enforces conflict rules based on predefined security policies that evaluate user privilege levels and access history. When a user requests an entitlement, the SoD server compares it against stored conflict rules using pattern-based analysis of LDAP group names. If a conflict is detected, the system can either: (1) automatically revoke the conflicting entitlement, (2) flag it for manual review by an administrator, or (3) allow a temporary exception with a predefined expiration period, ensuring access is time-limited and auditable.

The present invention describes a SoD server for monitoring and controlling entitlements for IT assets in the enterprise network. The SoD server may communicate with the TAC system and an identity governance and administration (IGA) system to establish SoD conflict rules to identify entitlements in violation of the conflict rules. For example, a SoD conflict violation may arise when a user has a combination of entitlements that could subject the enterprise system to risk of internal fraud or inappropriate use of enterprise data. The SoD server addresses this problem by employing a centralized solution to prevent and detect entitlements that allow conflicting access to IT assets based on the pre-defined conflict rules. The SoD server may be configured to identity the conflicts when the entitlements are first requested by a user, or as part of a regular review of existing entitlements that has been approved for various reason, and provide an indication of the violation to the IGA system. In response to a detected violation to a conflict rule, the IGA system may take a remediation action based on a pre-defined rule, such as automatically resolving a conflict between two existing entitlements, canceling an entitlement request, prompting a user to see conflict review, or automatically seeing conflict review.

Figure 1:
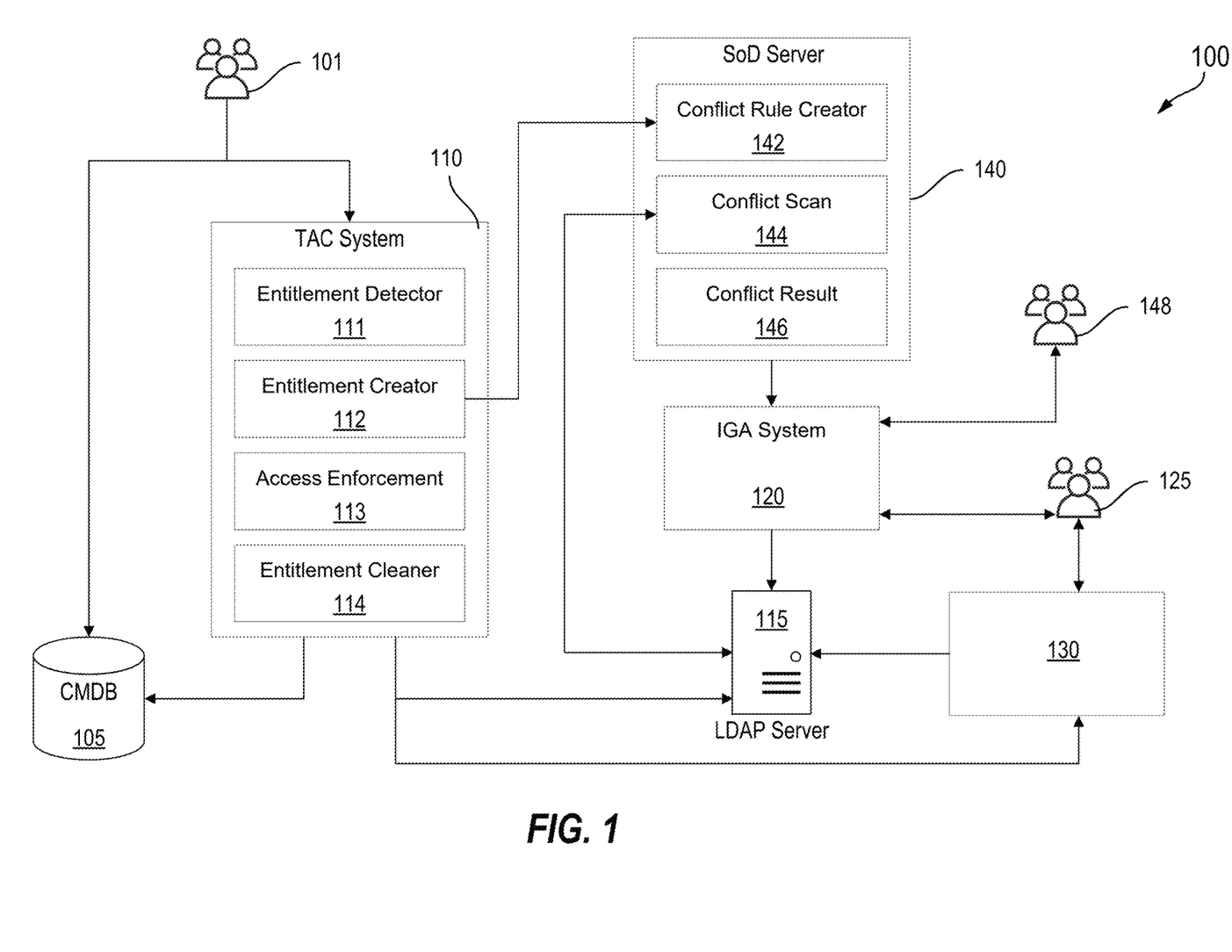
FIG. 1 shows a block diagram for an enterprise IT infrastructure system including a centralized technology access control system, a separation of duty server, a lightweight directory access protocol server, and an identity governance and administration system, configured to manage entitlements, in various aspects of the present invention.

FIG. 1 shows a block diagram for an enterprise IT infrastructure system 100 including a centralized technology access control system 110, a separation of duty server 140, a lightweight directory access protocol server 115, and an identity governance and administration system 120, configured to manage entitlements, in various aspects of the present invention. The enterprise IT infrastructure system 100 (also referred to as the "enterprise system" 100) comprises various components that operate, individually or in combination, to facilitate or undertake the various methods described in this disclosure. An IT application owner 101 may register a new IT resource or asset 130 for the enterprise system 100 and may be stored in a centralized database 105. The new IT resource 130 may be a new application or a new device. In various aspects, the IT assets or IT resources 130 may include an application, program, or other software or software package. The IT assets or IT resources may also be a technological or hardware asset that is added to the enterprise system 100, such as a computing device, a cellular or mobile device, a database, a server, or computing equipment or peripherals.

The centralized database 105 may be a configuration management (CM) database 105 that stores registration information and data associated with IT assets 130 in the enterprise system 100. An IT asset 130 may be a software-based application such as a customer relationship management (CRM) application or enterprise resource planning (ERP) application. An IT application may be run on, or be associated with, IT assets such as a Windows or Linux server, a PostgreSQL server, and/or a Web Server, etc.

The new IT resource or application 130 may be registered in the enterprise system 100 on the CM database 105 with information relating to any or all pre-existing IT assets in enterprise system 100, that may be associated with the new IT resource. CM database 105 may store partial or complete IT applications and new IT resources related data fields stored in the applications. In one example, the CMDB 105 may store for each IT resource/application, an IT resource/application ID, a resource/application type, a resource/application environment, and the associations with pre-existing IT assets, or the like. The CM database 105 may contain identifying data such as metadata of the new IT asset that has been added to the enterprise system 100. The metadata in CM database 105 may include and are not limited to registration metadata, application metadata, metadata describing hardware components, and user metadata.

The enterprise system 100 also includes the TAC system 110 that may be deployed on a server or a collection of distributed servers in a local datacenter or cloud computing environment. The TAC system 110 comprises a plurality of modules including, an entitlement detector module 111, an entitlement creator module 112, an access enforcement module 113, and an entitlement cleaner module 114. The entitlement detector module 111 may automatically detect or discover a registered new IT resource or new IT asset in CM database 105. The detection or discovery may occur based on periodic scans of the CM database 105 by the entitlement detector module 111, or based on notifications or knowledge that the TAC system 110 receives from one or more components of enterprise system 100. In various aspects, the detecting may occur with entitlement detector module 111 communicating with, sending, or transmitting an API call to CM database 105, and receiving a response to the API call from CM database 105 that includes information about the newly registered IT asset, which information may comprise meta data that either informs entitlement detector module 111 that the new IT asset or resource is unmanaged, or allows the entitlement detector module 111 based on the meta data to determine that the newly registered IT resource or asset is yet unmanaged. As used herein, an "unmanaged" IT asset or resource is an IT asset or resource that is only known to networking infrastructure; it may or may not be known and accounted for in an asset inventory, and is not actively managed from an IT or security perspective.

In various aspects, after the entitlement detector module 111 discovers the unmanaged IT assets based on data in the CM database 105, entitlement detector module 111 passes the detection result to the entitlement creator module 112. The entitlement creator module 112 creates LDAP groups or LDAP group names that define entitlements of users or groups of users. The entitlement creator 112 may define entitlements at a fine-grain level of granularity based on application ID, environment, resource and corresponding role. For example, it could be an entitlement group "tac-{applicationid}-{env}-db-write" which indicate production environment (i.e., "prod") database write permission on a specific application. These LDAP group names, created by the entitlement creator module 112, are turned into entitlements in LDAP server 115 based on a format of pre-defined rules and using the metadata retrieved from CM database 105 and/or the new IT asset. The SoD server 140 may evaluate two entitlements under a conflict rule based on a comparison of LDAP group names. The SoD server 140 may determine that the two entitlements create a conflict pair based on a violation of the conflict rule.

The entitlements may be adaptive and automatically updated based on identified conflicts or changes to the enterprise system 100. The TAC system 110 may modify existing entitlements by automatically incorporating new parameters in an LDAP group name including the roles, groups, or descriptors of IT assets, based on detected changes in the CM database and the rest of the enterprise system 100 as needed. The LDAP servers 115 are used to store the created entitlements for the different IT resources and assets for access control and permissions. The LDAP servers 115 function as a central repository to allow all various components of the enterprise system 100 to access and interact with the uniform and centralized entitlements created and managed by the TAC system 110. The uniform nature of the system of entitlements allows the various components to share a common platform based on the TAC system 110 for updates and changes to occur and be communicated and applied across the whole enterprise system 100.

The access enforcement module 113, after the creation of the entitlements, may provision or map the new IT resource(s) 130 to pre-existing components or pre-existing IT assets in the enterprise system 100. This may for example include mapping a newly registered application to a pre-existing server of the enterprise system 100, or to another pre-existing application such as an operating system running on one or more servers, or it may include mapping a device or newly deployed server or other hardware to other hardware and servers, or to software already deployed on the enterprise system 100. IT asset registration or expansion may comprise horizontal or vertical deployments of the new IT resources or assets. Mapping of the new IT resources could in various aspects be undertaken by a script or application that maps the new IT resource with the pre-existing IT assets or resources.

The LDAP group names, which define the entitlements, and the entitlements are stored in the LDAP server(s) 115 and may therefore be scanned for any failures, errors, or conflicts with other entitlements. The entitlement cleaner module 114 may identify unauthorized entitlements based on existing unique pre-defined entitlement structures and rules in the TAC system 110 and conduct remediation to remove or modify the unauthorized entitlements automatically. The enterprise system 100 also includes an identity governance and administration (IGA) system 120, which provides entitlement lifecycle management capabilities to users or groups of users 125. In one example, the IGA system 120 may comprise a front-end interface for users 125 to manage entitlements. The entitlement lifecycle management capabilities may include access requests, provisioning, review, and revocation of permissions and access. IGA system 120 adopts the LDAP group names and manages them as entitlements for lifecycle management of IT assets and how they are accessed by users and groups of enterprise system 100. The IGA system 120 may also manage IT assets across the enterprise system 100 based on internal documents, policies, rules, and administrative governance structures and/or based on the entitlements that are created by TAC system 110. For example, the IGA system 120 may comprise predefined rules entitlement conflict resolution.

When a user or group of users 125 (e.g., IT asset users) attempts to request access to a registered IT asset, such as an application, the IGA system 120 may be able to access a list of entitlements for the registered IT asset, for example from LDAP server 115. The IGA system 120 may determine whether a user 125 should have access to the IT asset based on the list of entitlements. In various aspects, IGA system 120 may determine the entitlements for a user 125 automatically or periodically, without requiring the user 125 to request or attempt to access an IT asset. The IGA system 120 may determine, based on a list or other available data in the LDAP server(s) 115 of entitlements that are stored and mapped to the IT assets, whether the user 125 should be provided access or assigned roles that allow the user 125 to utilize or access an IT asset, governed by the entitlement. The IGA system 120 may use entitlements individually or in combination with administrative or governance rules and policies.

The IGA system 120 may then assign a user 125 a permission or role to access an IT asset upon login into an IT asset system 130. IT asset system 130 may host various IT applications and comprise a plurality of servers running different operating system server and database software, such as PostgreSQL, Linux, and Windows. The IT asset system 130 may also evaluate the entitlements and roles created by the LDAP server 115 and/or the IGA system 120 to enable the user 125 access to the services and IT resources governed by the entitlements and ensure that these roles apply to the user. The IT asset system 130 may further comprise a technology separation of duty (SoD) engine or the SoD engine may be a stand-alone server system.

In various embodiments, an "entitlement" can refer to a set of access rights assigned to a user or group for an IT asset, embodied by an LDAP group name. A "conflict rule" can define a forbidden combination of entitlements that, if granted to the same user, presents a security or governance risk. A "SoD conflict" can occur when a user holds or requests entitlements that match a predefined conflict rule. And "remediation" can refer to automatic or semi-automatic actions such as entitlement revocation, temporary exception approval, or requiring reviewer intervention.

In various aspects, The TAC system 110 may generate an entitlement for one or more groups of enterprise users 125. All IT resources and assets in the enterprise system 100 are managed or registered based on created entitlements that are based on a uniform naming convention (also referred to herein as an "LDAP group naming convention" or "naming convention"). In various aspects, the entitlement is created in the LDAP server 115 where the entitlement is embodied or created based on an LDAP group name. The entitlement may be generated based on metadata associated with the IT resource in combination with the uniform naming convention utilized by the TAC system 110. The predefined naming convention may include metadata associated with the IT resource that is stored in the CM database 105.

An example of an LDAP group naming convention for a windows environment is shown in Table-1 below:

TABLE-1

LDAP group naming convention

| Sequence | Definition | Max Length | Description | Examples |
|---|---|---|---|---|
| 1 | TYPE | 3 | TAC role type, pa or tac | pa, tac |
| 2 | EONID | 6 | EONID of the application | 123456 |
| 3 | ENV | 4 | Environment of the application | dev, qa, uat, prod |
| 4 | INFRA | 5 | Infrastructure type | win, unx |
| 5 | ROLE | 5 | Role name | read, write, admin, rdp |

The LDAP group naming convention may contain a number of sequences that may make up the full name defining the entitlement, with each sequence having a maximum length of an associated string, of other characters, or bytes. The naming convention may also have several definitions that may define the type of entitlement or name, the ID of an application, or other IT resource or asset, the environment the application or asset will be deployed, the infrastructure type, for example, Windows, Linux, Unix and the like, and the roles associated with the specific name, for example a read-only role, and read and write role, an admin role, or an "rdp" (remote desktop) role for example, with the roles defining the permissions associated or available to members of a group defined by the particular name defining the entitlement. Various other definitions or parameters may be added to customize each name or naming convention.

An example name, created by the naming convention, may include the following parameters: for Application ID='00001', Environment='QA' (quality assurance), Asset Type='Windows', Role='rdp', where the LDAP group name may be: TAC_00001_QA_WIN RDP. The LDAP server 115 stores the LDAP names and acts as the entitlement store for IT assets. The naming convention ensures the uniqueness of entitlement structure and content for a specific IT Asset. As another example, an IT asset may be defined as Application ID='00002', Environment='Prod' (production), Asset Type='Linux', Role='read', with a LDAP group name of: TAC 00002 Prod Linux Read.

The access enforcement module 112 maps the entitlement for each of the one or more groups to one or more target IT assets (also referred to as "pre-existing IT asset(s)" or "pre-existing IT resource(s)") of the enterprise already registered, based on the LDAP group name. These target IT assets may be servers, databases, applications, operating systems or management or deployment software utilized to control and manage access or provide a user interface to access IT resources on the enterprise. In various aspects, the mapping may include executing a script or program configured to associate the LDAP group or LDAP group name to the one or more target or pre-existing IT assets, to allow use of the new IT resource with the one or more target or pre-existing IT assets.

In one example, a graphic design software application may be installed on the enterprise system 100 as a new IT asset. The software application may be installed on the enterprise system 100 with at least its metadata, if not the whole application, stored on the CM database 105. The TAC system 110 may perform a scan of the CM database 105, with the entitlement detector 111, at predetermined times or periodically intervals to determine whether all IT assets are registered with corresponding entitlements. The entitlement detector 111 may determine that the newly installed application is an unregistered application. Alternatively, the TAC system 110 may receive information from anywhere in the enterprise system 100 to detect or determine that a new application has been installed on the CM database 105. TAC system 110 may first detect the installed application and may then optionally additionally determine that the application is unregistered with the rest of the system or unmanaged by the system or the TAC system 110. The TAC system 110 may generate, with the entitlement creator 112, an entitlement for one or more groups of users of the enterprise system 100, corresponding to the unmanaged application or new IT resource. In various aspects, the entitlement may be created based on the naming convention and/or the metadata of the application, registered in the CM database 105. The metadata may define details of the application such as the software platform(s) it will be run on or is compatible with, the types of hardware it is designed for, the users that it is targeted for, the properties of the application such as file names, sizes and types, environments it will be deployed in, any licenses that may be associated with the application, and the like. Additionally, the entitlement may be based solely on the name generated from the naming convention.

Once the entitlement is generated by the entitlement creator 112 the access enforcement module 113 maps the entitlement to existing IT assets. In one example, if the enterprise system 110 is running both Windows and Linux systems, the IT application may only be operable on assets running the Windows systems, and not operable on those servers or devices running Linux. Therefore, the TAC system 110 may map the IT application to only assets running Windows. Additionally, the metadata that the entitlements were based on may indicate that only one group of users or team in the enterprise system 100 has a license for this software application, such as the graphics design team. This association with the group/team may be defined in one of the naming convention parameters as 'GD', for the graphics design team. If for example the design team only uses Windows hardware or servers, then the entitlement may be mapped to those Windows servers that run software for the 'GD' team but no other Windows hardware, databases or servers. Therefore, the entitlement may have parameters that define the users as well as parameters that define device and user mappings to the new IT resource or application. Further, the parameters may define, for example, any relevant servers, devices, or other IT resources or assets that should be associated with these newly created entitlements.

After creating an entitlement and mapping the entitlement to one or more IT resources or assets, and mapping entitlements associating different IT assets together under an entitlement, the IGA system 120 can determine whether a user or group of users is able to access the IT resource, view, read, write, modify, delete, execute, or take any other action that utilizes the IT resource. The IGA system 120 may be configured to manage and enforce access IT resources based on at least one of: the entitlement, and IGA administrative control processes.

The IGA system 120 is not solely governed by the entitlement, but also may rely on administrative policies and rules, for example, if a user is part of a group, or utilizing a machine which is designated an entitlement that would ordinarily allow the user to use an application on the designated device, the user may be denied such access if administrative policies determine that the user should not be allowed access. For example a designer in the design team may be allowed based on the entitlement to access the design software, but a secretary in the design team who may be covered by the design team entitlement, may not be based on his or her job description in the system and the IGA system 120 be allowed access to the design software, i.e., the internal administrative policies applied by the IGA system 120 may override the entitlement or work together with entitlements to determine permissions that deny access to the IT resource for the secretary even if under the entitlement, the secretary is part of the group with access to the design software. In various aspects, the entitlement may be the only factor the IGA system 120 uses to determine, or enforce access or management of IT resources, without any input from other administrative rules or policies.

FIG. 1 further shows the SoD server 140 in communication with TAC system 110, IGA system, and LDAP server. The SoD server 140 may be deployed on one or more distributed servers through a local datacenter or cloud computing environment. The SoD server 140 comprises a conflict rule creator (CRC) module 142, a conflict scan module 144 that generates conflict results 146. The CRC module 142 comprises or defines conflict rules according to conflict pairs (e.g., a first entitlement in conflict with a second entitlement) for entitlements of every IT asset and enterprise users 125. The CRC module 142 may identify a conflict pair for a conflict rule based on the LDAP group name, which includes "{ApplicationID}", "{Environment}", "{AssetType}", "{Role}". The SoD server 140 may store the conflict rules locally in a database of conflict rules created by CRC module 142. The conflict rules may correspond to a one-to-one mapping (e.g., a specific rule for a specific IT asset or user group) or one-to-many mappings (e.g., one rule for multiple IT assets or user groups). The conflict rules are designed to separate development roles from critical production environment roles. For example, the SoD server 140 may determine that a violation to a conflict rule exists for a user (e.g., employee) 125 that holds both a code-commit role and a database read/write role. The conflict scanning module 144 is a component configured to scan all the existing LDAP entitlement groups in the LDAP server 115 based on the predefined conflict rules from the CRC module 142. For Example, the conflict scanning module 144 may identify a first entitlement based on Application ID='00003'; Environment='Prod' (production); Asset Type='Windows', 'Linux', 'DB', 'Secret Vault', 'SDLC'; Role='write'; with a LDAP group name of: TAC_00003_Prod_WindowsLinuxDBSecretVaultSDLC_Write, and a second entitlement may be Application ID='00003'; Environment='Dev' (developer); Asset Type='null'; Role='code commit'; with a LDAP group name of: 00003_Dev_CodeComit. The conflict rule may indicate that the first entitlement does not overlap with the second entitlement, where the entitlements are a conflict pair. Therefore, the conflict scanning module 144 may determine a violation to the conflict rules based on the naming convention of two or more entitlements, defined by the LDAP group name. Once the SoD server 140 performs a conflict scan, a conflict result may be generated for user 125 at a specific timestamp. The SoD server can evaluates entitlements against a predefined set of conflict rules, scanning existing access permissions to detect combinations that pose security risks. When a conflict is detected, the system can either automatically revoke excessive privileges or flag them for manual review, ensuring that high-risk permissions are not inadvertently granted.

The following example illustrates a typical entitlement request lifecycle and conflict evaluation within the enterprise system. Consider a developer named Alice who requests an entitlement to perform database writes on a production PostgreSQL server. The request is submitted via the IGA system 120, which forwards it to the SoD server 140 to evaluate against conflict rules. The SoD server parses the entitlement's LDAP group name, TAC_00005_Prod_DB_Write, and identifies that Alice already holds TAC_00005_Dev_CodeCommit—an entitlement for committing code in the development environment for the same application ID. Based on a stored conflict rule prohibiting simultaneous production write and development code-commit roles, the SoD server flags a violation and sends a conflict result to the IGA system. The IGA system then prompts Alice with a choice to cancel the request or seek temporary approval. Upon choosing the latter, a SoD reviewer receives the request, grants a 72-hour exception, and the system logs the decision with an expiration policy. After 72 hours, the entitlement automatically reverts to the previous state. This example highlights the automated detection, reviewer escalation, and temporary privilege management enabled by the system.

Figure 2A:
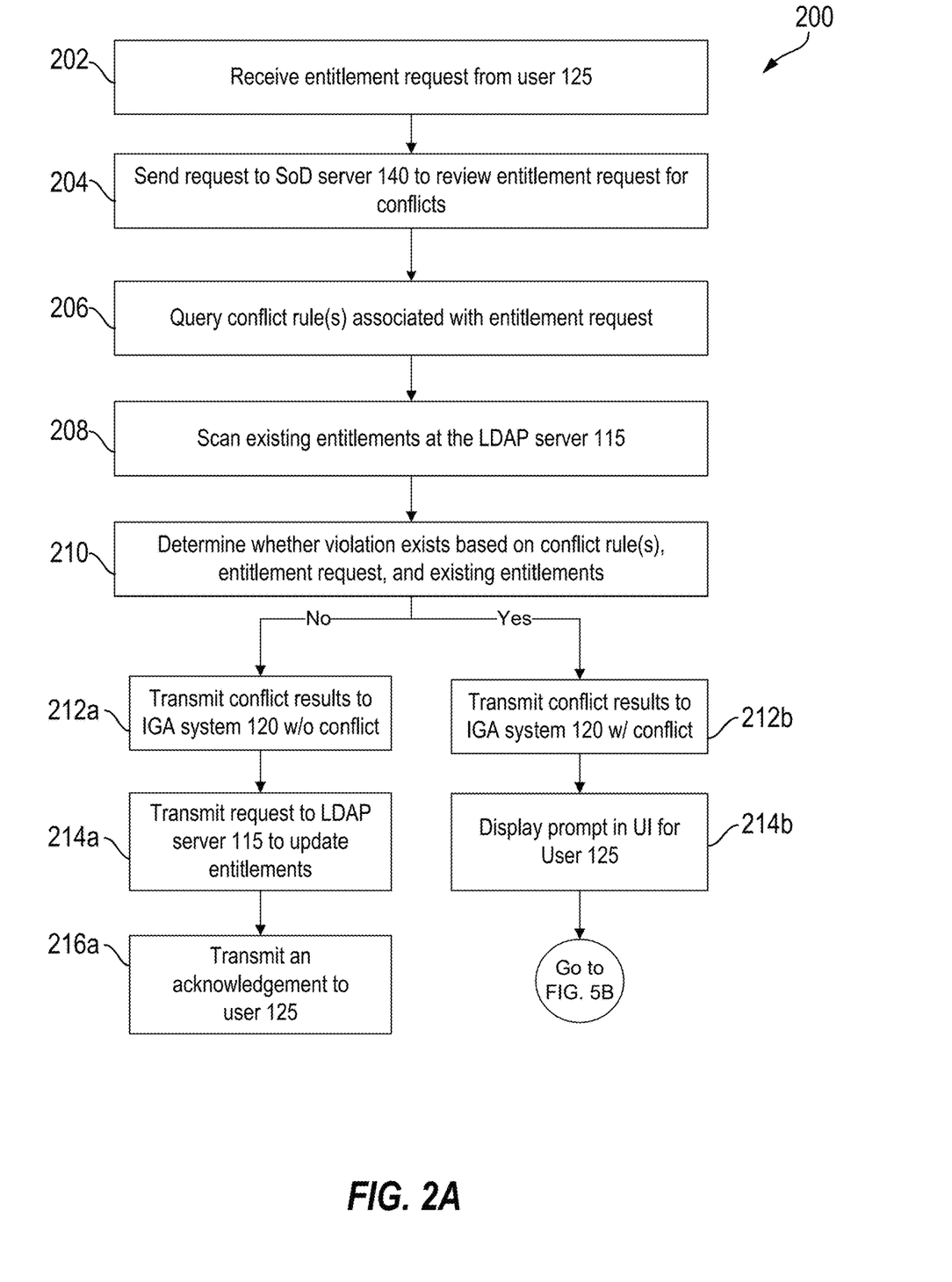
FIGS. 2A and 2B shows a logic flow diagram for an entitlement conflict review process, including an IGA system in communication with a SoD server to evaluate an entitlement request, according to various aspects of the present invention.
Figure 2B:
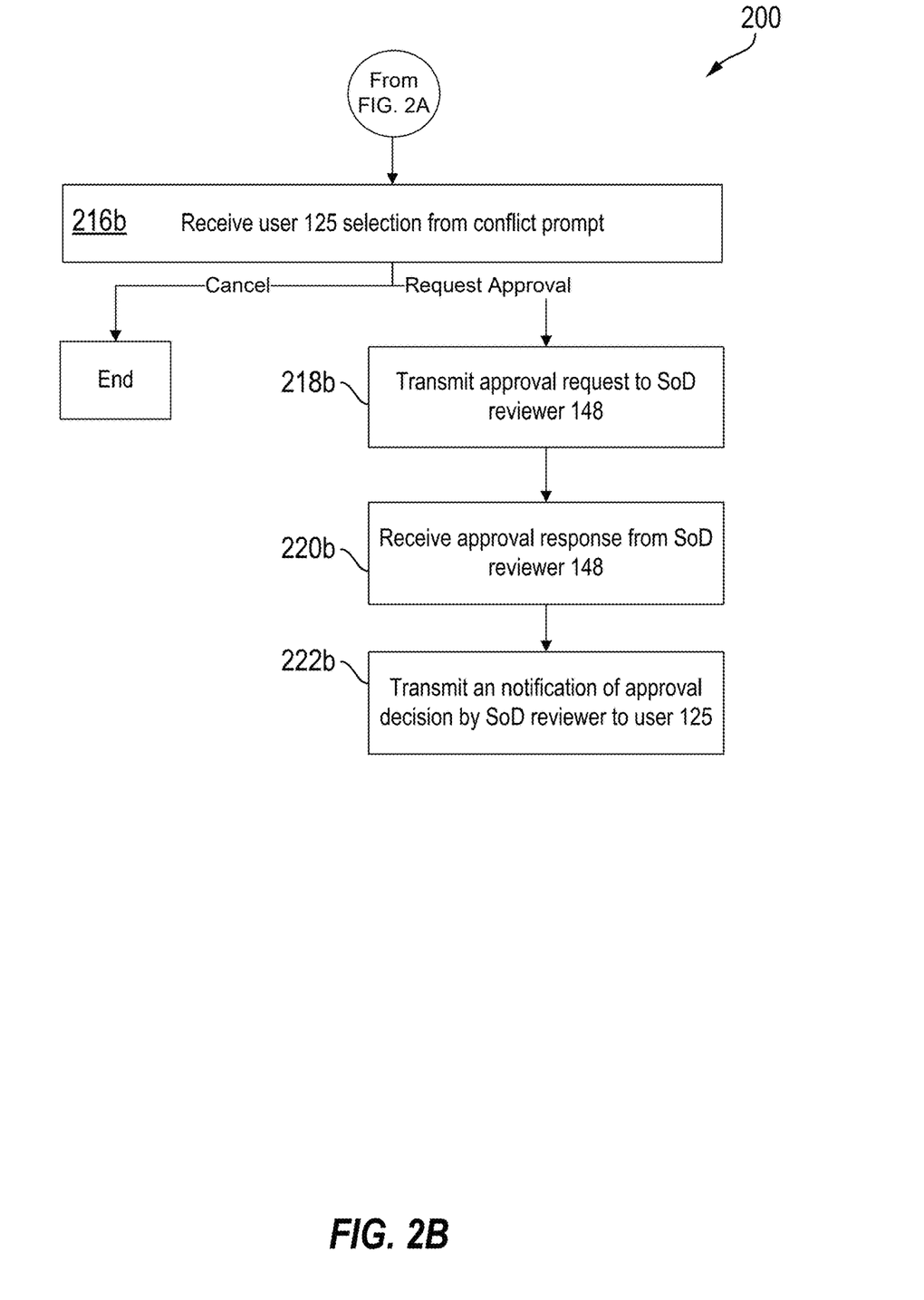

FIGS. 2A and 2B shows a logic flow diagram for an entitlement conflict review process 200, including an IGA system 120 in communication with a SoD server 140 to evaluate an entitlement request, according to various aspects of the present invention. The IGA system 120 receives, at step 202, a request from a user 125 to add or create a TAC entitlement. The request comprises a role or permission for the user, as part of a user group or team, for an IT asset. The IGA system 120, at step 204, sends a request to the SoD server 140, to determine whether the entitlement request conflicts with any existing entitlements. Note, the TAC system is responsible for periodically scanning the LDAP server to ensure that all IT assets have an associated entitlement. If the TAC system determines that a user group or IT asset does not have an entitlement, the entitlement creator is tasked with establishing entitlements.

The SoD server 140 retrieves or queries, at step 206, an associated rule for the user group and/or applicationID, created (predetermined) by the CRC module 142, to determine conflict compliance based on the conflict rules (conflict pairs). The conflict scan module 144 performs, at step 208, a scan of existing entitlements associated with the user group for the user 125 and/or the applicationID. The conflict scan module 144 determines, at step 210, whether a policy violation exists based on the conflict rules, the existing entitlement, and the requested entitlement.

If the conflict scan module 144 identifies a violation exists with the conflict rule (e.g., "yes"), the conflict scan module 144 transmits, at step 212b, conflict results 146 to the IGA system 120 that identify the violation(s). In various aspects, the conflict scan module 144 may continue to determine if there are additional conflicts after a first violation is identified so that the user 125 is provide with an exhaustive list of entitlement conflicts for the entitlement request. The conflict scan module 144 may provide a confirmation that the scan is complete with the conflict results 146 (including a list of all entitlement conflicts). Alternatively, the conflict scan module 144 provides, at step 212*a*, the conflict results 146 including a confirmation that the scan is complete and an empty set that does not identify any conflicts, or an affirmative result that indicates no conflicts were found. The IGA system 120 receives the conflict results 146. If no conflicts are discovered, IGA system 120 transmits, at step 214*a*, a request to update the existing entitlement(s) based on the requested entitlement. The IGA system 120 transmits, at step 216*a*, a confirmation or acknowledgement to the user 125, that the requested entitlement was processed successfully. Alternatively, if the conflict results 146 indicate that one or more conflicts exist, the IGA system 120 displays, at step 214*b*, a prompt (e.g., pop up message, notification, or the like) in the user access request interface. The user 125 may elect, at step 216*b*, to either: 1) continue with the policy violation; or 2) cancel the entitlement request. If the user 125 elects to continue without resolving the conflict (i.e., continue with the policy violation) of the entitlement request, the IGA system 120 transmits, at step 218*b*, a conflict approval request to an SOD Reviewer 148 (e.g., senior managers). The approval request may comprise the entitlement request, the conflict rule, the existing entitlement. If the SoD reviewer 148 approves the conflict request, the approval may require an expiration period to be included by the SoD reviewer 148. Alternatively, the conflict approval may default to a predetermined expiration period if the SoD reviewer 148 does not provide an expiration period. The default expiration period may be less than a maximum allowable expiration period that can be manually entered by the SoD reviewer 148. When a temporary entitlement expires, the system can trigger an automated entitlement rollback, reverting the user's permissions to the previous access level. If additional access is required, a new request must be submitted, ensuring that elevated privileges are never granted indefinitely. All entitlement changes are logged in the system's audit trail, providing transparency and regulatory compliance. For example, upon reaching the expiration of the approved conflict time period, the IGA system 120 may revert back to a lower-level entitlement, the pervious entitlement prior to the entitlement request, prompt the SoD reviewer for a recertification of a conflicting status, or revoke all entitlements associated with the entitlement request. If the conflicting status is recertified by the SoD reviewer 148, the subsequent expiration period may be shorter than the first expiration period to prevent a perpetual conflicting entitlement status. Additionally, the conflicting entitlement status may be recertified up to a predetermined number of times (e.g., can only recertify a conflicting entitlement status once or twice before the IGA system 120 reverts to a lower entitlement). In various aspects, the conflicting entitlement status cannot be permanently approved. The SoD review may also deny the conflict request. The IGA system 120 receives, at step 220*b*, a response that the request was approved or denied by the SoD reviewer 148 and notifies, at step 222*b*, the user 125 that their entitlement request denied or temporarily approved with the predetermined expiration dated based on the identified conflict.

Figure 3:
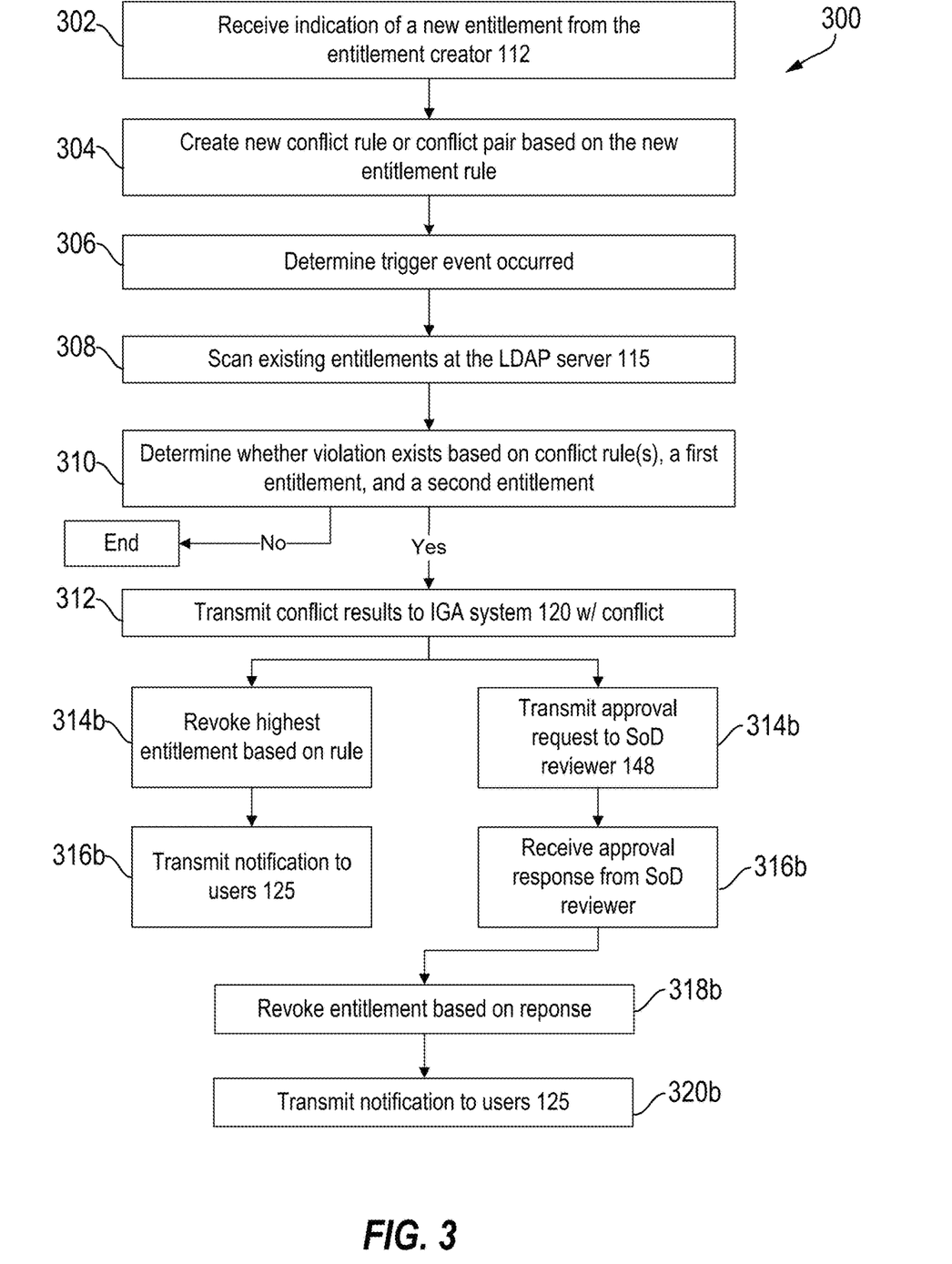
FIG. 3 shows a logic flow diagram for automatically reviewing entitlements in a preventative separation of duty control process, including a SoD server configured to periodically review entitlements at the TAC system, according to various aspects of the present invention.

FIG. 3 shows a logic flow diagram for automatically reviewing entitlements in a preventative separation of duty control process 300, including a SoD server 140 configured to periodically review entitlements at the TAC system 110, according to various aspects of the present invention. The preventative review process 300 may be initiated by the CRC module 142 that receives, at step 302, an indication (e.g., message, notification, or data) from the entitlement creator 112 that a new entitlement was created for a user group, team, applicationID, or other IT asset. The CRC module 142 creates, at step 304, a new conflict rule (e.g., conflict pair, conflict mapping) based on the new entitlement created by the entitlement creator 112. The SoD server 140 determines, at step 306, a trigger event has occurred. In response to a trigger event (e.g., creation of the new conflict rule, periodic scan interval) the conflict scan component 144 scans, at step 308, all existing LDAP entitlement groups for all users, at the LDAP sever 115. The trigger event may include the creation of a new conflict rule, or a predetermined periodic interval. The conflict scan module 144 determines, at step 310, whether a policy violation exists based on the conflict rules, a first entitlement, and a second entitlement. The conflict scan module 144 may repeat the conflict rule evaluation for all permutations of users, groups, and/or teams, for their associated entitlements. If the conflict scan module 144 cycles through all entitlements without identifying a rule violation, the SoD server does not take any action.

In various aspects, the conflict scan module 144 performs rule evaluation by parsing the LDAP group names of each entitlement to extract structured fields such as application ID, environment, infrastructure type, and user role. These fields are compared against the stored conflict rules, which define prohibited combinations (e.g., write access in production and code commit access in development for the same application). The system may use pattern matching or regular expressions to determine if two entitlements held by a user match a predefined conflict pair. For example, if a user holds entitlements with LDAP group names "TAC 00003 Prod_DB_Write" and "TAC_00003_Dev_CodeCommit", the conflict scan module 144 identifies these as a conflicting pair based on a rule that prohibits simultaneous assignment of write access to production databases and code deployment access in development for the same application ID.

However, if the conflict scan module 144 identifies conflict results, SoD server 140 transmits, at step 312, the conflict results to the IGA system 120. In various aspects, the conflict scan module 144 may continue to determine if there are additional conflicts so that the user 125 is provide with an exhaustive list of potential entitlement conflicts with the entitlement request. The conflict scan module 144 may provide a confirmation that the scan is completed with a list of conflicting entitlements.

The IGA system 120 may determine, based on a governance rule, to automatically revoke the entitlement for the user, team, or group of users 125. The governance rule may identify a specific conflict pair and the entitlement that is revoked (e.g., revoke highest entitlement). The IGA system 120 transmits, at step 314*a*, an entitlement update request to the LDAP server 115 to revoke the highest entitlement for a conflict pair. The IGA system 120 transmits, at step 316*a*, a notification to the applicable team, user, user group 125 that the entitlement was revoked based on a conflict rule. The notification may comprise the remaining lower entitlement.

Figure 4:
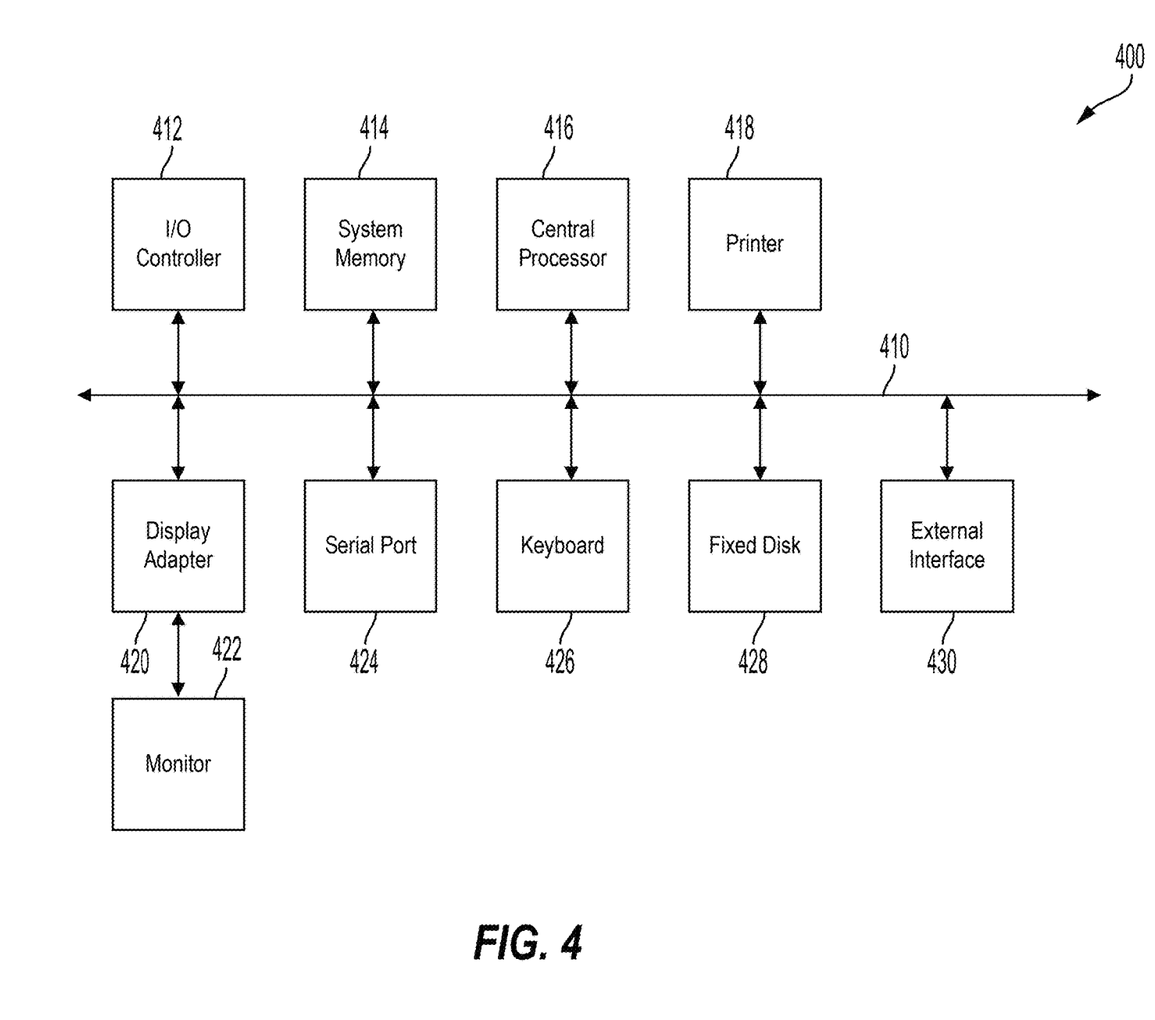
FIG. 4 is a block diagram of a computer apparatus with data processing subsystems or components, according to at least one aspect of the present disclosure.

The IGA system 120 may transmit, at step 314*b*, a conflict approval request to a SoD Reviewer 148 (e.g., senior managers). The approval request may comprise the conflict rule and the conflict pair. If the SoD reviewer 148 approves the conflict request, the approval may require an expiration period to be included by the SoD reviewer 148. Alternatively, the conflict approval may default to a predetermined expiration period if the SoD reviewer 148 does not provide an expiration period. The default expiration period may be less than a maximum allowable expiration period that can be manually entered by the SoD reviewer 148. Upon reaching the expiration of the approved conflict time period, the IGA system 120 may: 1) automatically remove the higher entitlement and leave the lower-level entitlement, or 2) prompt the SoD reviewer for a recertification of a conflicting status, or 3) revoke all entitlements associated with the entitlement request. If the conflicting status is recertified by the SoD reviewer 148, the subsequent expiration period may be shorter than the first expiration period to prevent a perpetual conflicting entitlement status. Additionally, the conflicting entitlement status may be recertified up to a predetermined number of times (e.g., can only recertify a conflicting entitlement status once or twice before the IGA system 120 reverts to a lower entitlement). In various aspects, the conflicting entitlement status cannot be permanently approved. The SoD reviewer 148 may also deny the conflict request so select a specific entitlement to revoke. The IGA system 120 receives, at step 316b, a response that the conflict request was approved, denied, or a specific entitlement was revoked by the SoD reviewer 148. In response to a denying or revoking an entitlement, the IGA system 120 transmits, at step 318b, an entitlement update request to the LDAP server 115 to revoke the highest entitlement for a conflict pair or the specific entitlement identified by the reviewer 148. The IGA system 120 transmits, at step 320b, a notification to the applicable team, user, user group 125 that the entitlement was revoked based on a conflict rule. The notification may comprise the remaining entitlement for the team, user, user group 125. In cases where temporary elevated access is necessary-such as troubleshooting a production system—the system can allow for conditional exceptions that are granted based on role-based approvals, predefined time limits, or explicit requests subject to managerial review. This can ensure that critical tasks can be performed without permanently increasing security risks FIG. 4 is a block diagram of a computer apparatus 400 with data processing subsystems or components, according to at least one aspect of the present disclosure. The SoD server 140, LDAP Sever 115, IGA system 120, and/or the TAC system 110 may be embodied with a computer apparatus such as illustrated in FIG. 4. The subsystems shown in FIG. 1 are interconnected via a system bus 410. Additional subsystems such as a printer 418, keyboard 426, fixed disk 428 (or other memory comprising computer readable media), monitor 422, which is coupled to a display adapter 420, and others are shown. Peripherals and input/output (I/O) devices, which couple to an I/O controller 412 (which can be a processor or other suitable controller), can be connected to the computer system by any number of means known in the art, such as a serial port 424. For example, the serial port 424 or external interface 430 can be used to connect the computer apparatus to a wide area network such as the Internet, a mouse input device, or a scanner. The interconnection via system bus allows the central processor 416 to communicate with each subsystem and to control the execution of instructions from system memory 414 or the fixed disk 428, as well as the exchange of information between subsystems. The system memory 414 and/or the fixed disk 428 may embody a computer readable medium.

Figure 5:
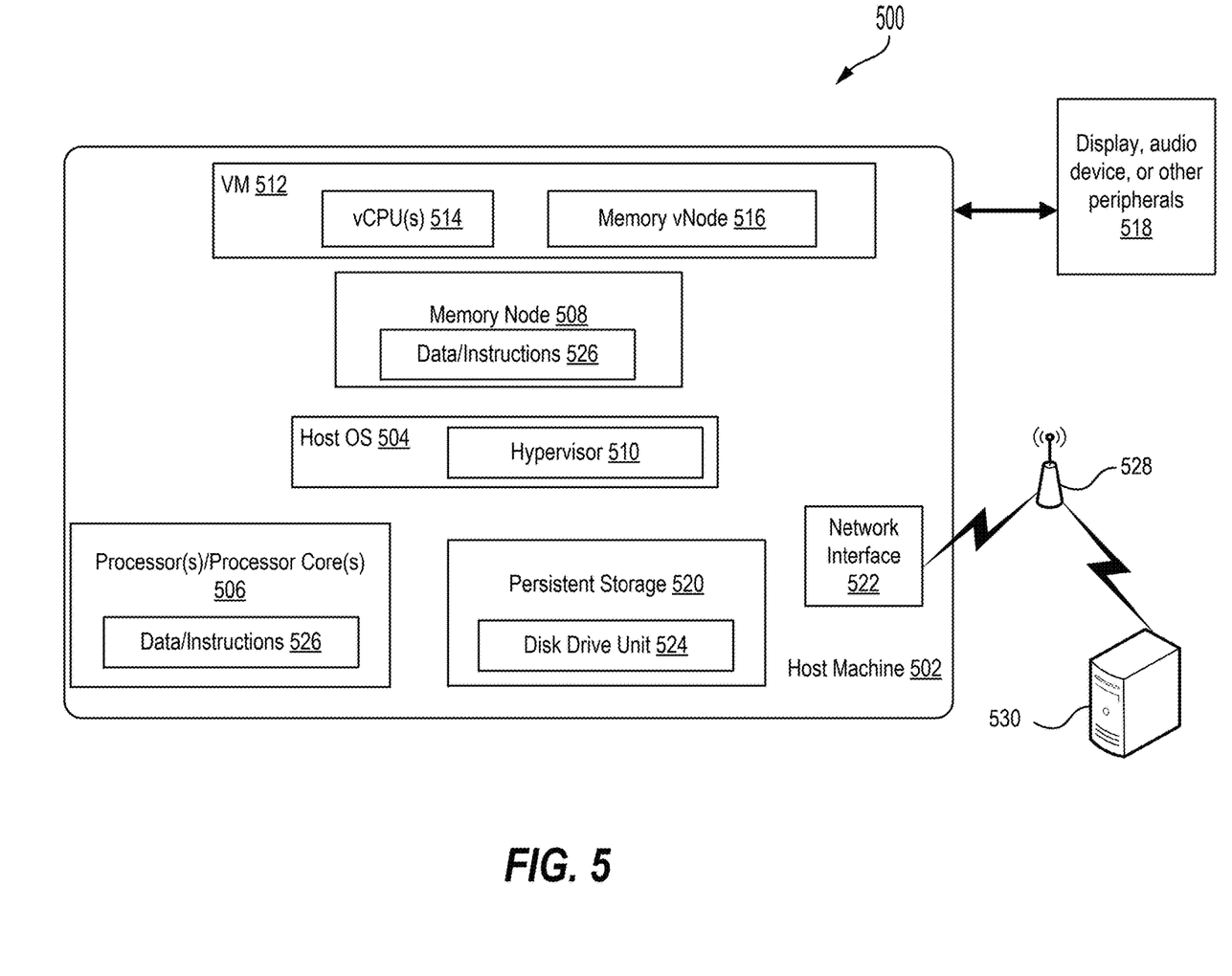
FIG. 5 is a diagrammatic representation of an example system that includes a host machine within which a set of instructions to perform any one or more of the methodologies discussed herein may be executed, according to at least one aspect of the present disclosure.

FIG. 5 is a diagrammatic representation of an example system 500 that includes a host machine 502 within which a set of instructions to perform any one or more of the methodologies discussed herein may be executed, according to at least one aspect of the present disclosure. In various aspects, the host machine 502 operates as a standalone device or may be connected (e.g., networked) to other machines. In a networked deployment, the host machine 502 may operate in the capacity of a server or a client machine in a server-client network environment, or as a peer machine in a peer-to-peer (or distributed) network environment. The host machine 402 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 500 includes the host machine 502, running a host operating system (OS) 504 on a processor or multiple processor(s)/processor core(s) 506 (e.g., a central processing unit (CPU), a graphics processing unit (GPU), or both), and various memory nodes 508. The host OS 504 may include a hypervisor 510 which is able to control the functions and/or communicate with a virtual machine ("VM") 512 running on machine readable media. The VM 512 also may include a virtual CPU or vCPU 514. The memory nodes 508 may be linked or pinned to virtual memory nodes or vNodes 516. When the memory node 508 is linked or pinned to a corresponding vNode 516, then data may be mapped directly from the memory nodes 508 to their corresponding vNodes 516.

All the various components shown in host machine 502 may be connected with and to each other, or communicate to each other via a bus (not shown) or via other coupling or communication channels or mechanisms. The host machine 502 may further include a video display, audio device or other peripherals 518 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker,) a persistent storage device 520 (also referred to as disk drive unit), and a network interface device 522. The host machine 502 may further include a data encryption module (not shown) to encrypt data. The components provided in the host machine 502 are those typically found in computer systems that may be suitable for use with aspects of the present disclosure and are intended to represent a broad category of such computer components that are known in the art. Thus, the system 500 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

The disk drive unit 524 also may be a Solid-state Drive (SSD), a hard disk drive (HDD) or other includes a computer or machine-readable medium on which is stored one or more sets of instructions and data structures (e.g., data/instructions 526) embodying or utilizing any one or more of the methodologies or functions described herein. The data/ instructions 526 also may reside, completely or at least partially, within the main memory node 508 and/or within the processor(s) 506 during execution thereof by the host machine 502. The data/instructions 526 may further be transmitted or received over a network 528 via the network interface device 522 utilizing any one of several well-known transfer protocols (e.g., Hyper Text Transfer Protocol (HTTP)).

The processor(s) 506 and memory nodes 508 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 502 and that causes the host machine 502 to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 530 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 502, with each server 530 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object-oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In one general aspect, therefore, the present invention is directed to an enterprise system that includes an identity governance and administration (IGA) system that is configured to enforce predefined governance rules. The system further includes a lightweight directory access protocol (LDAP) server that stores a database of entitlements associated with information technology (IT) assets that are registered to the enterprise system. A separation of duty (SoD) server is also provided. The SoD server is configured to communicate with both the LDAP server and the IGA system. The SoD server is further configured to determine a trigger event that initiates a SoD conflict compliance check of the entitlements. During the compliance check, the SoD server identifies one or more conflict rules that are associated with a first entitlement, scans the entitlements stored in the LDAP server based on those conflict rules, determines whether any of the entitlements violate the conflict rules, and transmits conflict results to the IGA system. The IGA system is then configured to determine, based on the conflict results, whether any violations of the conflict rules exist and to impose an entitlement conflict remediation action in accordance with the predefined governance rules.

In another general aspect, the present invention is directed to a method that includes the step of receiving, by an IGA system, an entitlement request from a user of the enterprise system. The IGA system transmits the entitlement request to a SoD server, which queries one or more conflict rules associated with the entitlement request. The SoD server scans a plurality of entitlements stored in an LDAP server by parsing LDAP group names that conform to a predefined entitlement naming convention and determines whether the entitlement request would violate any of the conflict rules. The SoD server then transmits conflict results to the IGA system, where the conflict results include an indication of one or more rule violations. The IGA system transmits a prompt to the user identifying the rule violations and providing the user with options to cancel the request or seek further approval. A response from the user is then received by the IGA system.

In another aspect, the method includes the step of receiving, by a SoD server, a notification of a trigger event that initiates a SoD conflict compliance check. The compliance check is performed for a plurality of entitlements associated with IT assets across all users in the enterprise system. The SoD server scans the entitlements stored in the LDAP server using one or more conflict rules, identifies one or more entitlements subject to the conflict rules, and determines whether those entitlements are in violation of the rules. The SoD server transmits conflict results to the IGA system based on the completed scan. The IGA system then transmits a prompt to a conflict reviewer, where the prompt includes the identified conflict pair and allows the reviewer to impose an entitlement conflict remediation action.

In various implementations, the conflict rules enforced by the SoD server may be defined for specific combinations of entitlements that represent high-risk access scenarios. For example, one conflict rule may identify a conflict pair in which a first entitlement grants write access to a production database for a particular application, and a second entitlement grants code commit access to a development environment for the same application. The SoD server may determine that a conflict violation exists when a user is assigned both entitlements for the same application. This configuration provides protection against scenarios where the same user could introduce code changes and immediately manipulate production data, thereby violating core security or compliance policies.

In various implementations, the SoD server may determine that an entitlement violates a conflict rule based on a naming convention associated with the entitlement. For example, the SoD server may analyze structured LDAP group names that encode entitlement attributes such as application ID, environment, infrastructure type, and role.

In various implementations, the SoD conflict compliance check may be performed for all users in the enterprise system. The trigger event for initiating the compliance check may include a predetermined periodic scan interval or the receipt of a new entitlement from a technology access control (TAC) system.

In various implementations, the SoD server may receive a notification from a TAC system that a new entitlement has been created for an IT asset. Based on this notification, the SoD server may create a new conflict rule and initiate a conflict compliance check using the newly created rule. In this context, the notification itself serves as the trigger event.

In various implementations, the IGA system may receive a requested entitlement from a user and treat that request as a trigger event for SoD conflict checking. The requested entitlement is evaluated as the first entitlement in the conflict check process.

In various implementations, if the IGA system determines that the requested entitlement violates one or more conflict rules, it may transmit a prompt to the user indicating the conflict. The prompt may allow the user to cancel the request or submit it for temporary approval. The IGA system may then receive a response from the user indicating the selected option.

In various implementations, when temporary approval is requested, the IGA system may transmit a reviewer prompt to a designated SoD reviewer. The reviewer may approve the request for a limited duration, such as a first predetermined period of time. If approved, the IGA system may notify the user of the temporary approval. After the period expires, the entitlement may be automatically revoked or rolled back.

In various implementations, the IGA system may transmit a recertification request to the SoD reviewer before the temporary approval period expires. The second approval, if granted, may be limited to a shorter duration than the first. In some implementations, the system may limit the number of recertifications allowed before requiring revocation or permanent denial.

In various implementations, the conflict results transmitted by the SoD server may include, for each identified conflict, a user identifier, a pair of conflicting entitlements, and an indication of the violated conflict rule. The predefined naming convention for the entitlements may include structured fields such as application identifier, environment, infrastructure type, and user role.

In various implementations, an entitlement conflict remediation action may include automatically revoking one of the conflicting entitlements, granting temporary approval with expiration, or flagging the entitlement for further review. These actions may be governed by predefined governance rules stored in the IGA system and may be performed with or without user input, depending on configuration.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various aspects have been described herein, it should be apparent that various modifications, alterations, and adaptations to those embodiments may occur to persons skilled in the art with attainment of at least some of the advantages. Persons skilled in the art will appreciate that recited operations therein may generally be performed in any order. Also, although various operational flow diagrams are presented in a sequence(s), it should be understood that the various operations may be performed in other orders than those which are illustrated, or may be performed concurrently. The disclosed embodiments are therefore intended to include all such modifications, alterations, and adaptations without departing from the scope of the embodiments as set forth herein.

What is claimed is:

1. An enterprise system comprising:
    an identity governance and administration (IGA) system configured to enforce predefined governance rules;
    a lightweight directory access protocol (LDAP) server comprises a database of entitlements associated with information technology (IT) assets registered to the enterprise system;
    a separation of duty (SoD) server configured for communication with the LDAP server and the IGA system, wherein the SoD server is further configured to:
        determine a trigger event that initiates a SoD conflict compliance check for the entitlements associated with IT assets;
        determine, for the SoD conflict compliance check, one or more conflict rules associated with a first entitlement;
        scan, for the SoD conflict compliance check, the database of entitlements at the LDAP server based on the one or more conflict rules;
        determine, for the SoD conflict compliance check, whether one or more entitlements violate the one or more conflict rules; and
        transmit, for the SoD conflict compliance check, conflict results to the IGA system, and wherein the IGA system is configured to:
        determine whether the one or more entitlements violate the one or more conflict rules based on the conflict results;
        impose an entitlement conflict remediation action based on the conflict results and the predefined governance rules.

2. The enterprise system of claim 1, wherein the SoD server determines the one or more entitlements violate the one or more conflict rules based on a naming convention for the first entitlement or the one or more entitlements.

3. The enterprise system of claim 1, wherein the SoD conflict compliance check is performed for all users of the enterprise system.

4. The enterprise system of claim 3, wherein the trigger event is a predetermined periodic scan interval.

5. The enterprise system of claim 3, the SoD server is further configured to: receive, from a technology access control (TAC) system, a notification of a new entitlement created for an IT asset; create a new conflict rule based on the notification of the new entitlement; and initiate the SoD conflict compliance check based on the notification of the new entitlement, wherein the notification of the new entitlement is the trigger event.

6. The enterprise system of claim 1, the IGA system is further configured to:
    receive a requested entitlement by a user of the enterprise system; and
    transmit the requested entitlement to the SoD server, wherein the requested entitlement is the trigger event, and wherein the first entitlement is the requested entitlement.

7. The enterprise system of claim 6, the IGA system is further configured to:
    determine the requested entitlement violates the one or more conflict rules, based on an indication in the conflict results;
    transmit a prompt to the user of the enterprise system, wherein the prompt allows the user to cancel the requested entitlement or request temporary approval for the requested entitlement; and
    receive, from the user, a user response to the prompt.

8. The enterprise system of claim 7, the IGA system is further configured to:
    transmit, to a SoD reviewer, a reviewer prompt comprising a request for temporary approval of the requested entitlement, wherein the request for temporary approval is approved for up to a first predetermined period of time before the requested entitlement is automatically revoked; and
    transmit, to the user, a notification of the temporary approval of the requested entitlement.

9. The enterprise system of claim 8, the IGA system is further configured to transmit, to the SoD reviewer, a request to recertify the temporary approval of the requested entitlement, wherein the request to recertify the temporary approval can be approved for up to a second predetermined period of time before the requested entitlement is automatically revoked, wherein the second predetermined period is less than the first predetermined period.

10. The enterprise system of claim 1, wherein:
    the trigger event comprises at least one of:
        a notification of a newly created entitlement received from a technology access control (TAC) system; or
        a periodic scan interval;
    the one or more conflict rules comprise predefined pairs of LDAP group names formatted according to a naming convention including parameters selected from: application identifier, environment, infrastructure type, and user role; and the conflict results include, for each detected conflict, an identifier of the user, a conflicting entitlement pair, and an indication of a violated conflict rule.

11. A method comprising:
receiving, by an identity governance and administration (IGA) system, an entitlement request from a user of an enterprise system;
transmitting, by the IGA system, the entitlement request to a separation of duty (SoD) server;
querying, by the SoD server, one or more conflict rules associated with the entitlement request by the user;
scanning, by the SoD server, by parsing LDAP group names conforming to a predefined entitlement naming convention, a plurality of entitlements stored at an lightweight directory access protocol (LDAP) server based on the one or more conflict rules;
identifying, by the SoD server, existing entitlements at the LDAP server associated with the one or more conflict rules;
determining, by the SoD server, whether the entitlement request violates the one or more conflict rules based on the existing entitlements;
transmitting, by the SoD server, a conflict result to the IGA system, wherein the conflict result comprises an indication of one or more rule violations;
transmitting, by the IGA system, a prompt identifying the one or more rule violations to the user, wherein the prompt allows the user to cancel the entitlement request or seek further approval; and
receiving, by the IGA system, a response by the user.

12. The method of claim 11, further comprising:
transmitting, by the IGA system, a request for temporary approval of the requested entitlement to a SoD reviewer, wherein the request for temporary approval can be approved for up to a first predetermined period of time before the requested entitlement is automatically revoked; and
transmitting, by the IGA system, a notification of the response by the SoD reviewer to the user.

13. The method of claim 12, further comprising transmitting, by the IGA system, a request to recertify the temporary approval of the requested entitlement to the SoD reviewer, wherein the request to recertify the temporary approval can be approved for up to a second predetermined period of time before the requested entitlement is automatically revoked, wherein the second predetermined period is less than the first predetermined period.

14. A method comprising:
receiving, by a separation of Duty (SoD) server, a notification of a trigger event, wherein the trigger event initiates a SoD conflict compliance check for a plurality of entitlements associated with IT assets in an enterprise system;
scanning, by the SoD server, the plurality of entitlements for all users of the enterprise system based on one or more conflict rules, wherein the plurality of entitlements are stored at an LDAP server;
identifying, by the SoD server, one or more entitlements of the plurality of entitlements associated with the one or more conflict rules;
determining, by the SoD server, whether the one or more entitlements are in violation of the one or more conflict rules;
transmitting, by the SoD server, a conflict result to an identity governance and administration (IGA) system, wherein the conflict result is transmitted based on a complete scan of the plurality of entitlements for all users of the enterprise system; and
transmitting, by the IGA system, a prompt identifying the one or more violations for the one or more conflict rules to a conflict reviewer, wherein the prompt comprises a conflict pair associated with the one or more violations, and wherein the prompt allows the conflict reviewer to impose an entitlement conflict remediation action.

15. The method of claim 14, wherein the SoD conflict compliance check is performed for all users of the enterprise system.

16. The method of claim 15, wherein the trigger event is a predetermined periodic scan interval.

17. The method of claim 15, further comprising:
receiving, by the SoD server, a notification of a new entitlement created for an IT asset;
creating, by the SoD server, a new conflict rule based on the notification of the new entitlement; and
initiating, by the SoD server, the SoD conflict compliance check based on the notification of the new entitlement, wherein the notification of the new entitlement is the trigger event.

18. The method of claim 14, further comprising receiving, by the IGA system, a response from the conflict reviewer comprising a request to impose the entitlement conflict remediation action, wherein the entitlement conflict remediation action comprises one of: a request to revoke one or more entitlement in the conflict pair or temporary approval of the one or more entitlements in the conflict pair.

19. The method of claim 18, further comprising:
receiving, by the IGA system, a request for temporary approval of the one or more entitlements in the conflict pair, wherein the request for temporary approval can be approved for up to a first predetermined period of time before the one or more entitlements are automatically revoked; and
transmitting, by the IGA system to the user, a notification of the response by the SoD reviewer.

20. The method of claim 19, further comprising transmitting, by the IGA system, a request to recertify the temporary approval of the one or more entitlements in the conflict pair, wherein the request to recertify the temporary approval can be approved for up to a second predetermined period of time before the one or more entitlements are automatically revoked, wherein the second predetermined period is less than the first predetermined period.

* * * * *